United States Patent [19]

Anderson et al.

[11] Patent Number: 4,627,020
[45] Date of Patent: Dec. 2, 1986

[54] METHOD FOR ROTATING A BINARY IMAGE

[75] Inventors: Karen L. Anderson, Peekskill; Frederick C. Mintzer, Shrub Oak; Gerald Goertzel, White Plains; Joan L. Mitchell, Ossining, all of N.Y.

[73] Assignee: International Business Machines Corporation, Armonk, N.Y.

[21] Appl. No.: 567,214

[22] Filed: Dec. 30, 1983

[51] Int. Cl.⁴ .............. G06F 7/00; G06F 15/62; G06K 9/36
[52] U.S. Cl. .................................. 364/900; 382/46
[58] Field of Search ............... 382/46; 340/727, 728; 364/200 MS File, 900 MS File

[56] References Cited

U.S. PATENT DOCUMENTS

| | | | |
|---|---|---|---|
| 4,168,488 | 9/1979 | Evans | 340/727 |
| 4,245,321 | 1/1981 | Gennetten | 340/727 |
| 4,267,555 | 5/1981 | Boyd et al. | 340/727 |
| 4,271,476 | 6/1981 | Lotspiech | 382/46 |

OTHER PUBLICATIONS

Morrin, "Rotation of Images Using Contour Compressed Data", IBM Technical Disclosure Bulletin, vol. 18, #8, Jan. 1976, pp. 2640-2642.

Primary Examiner—David Y. Eng
Attorney, Agent, or Firm—George E. Clark; Thomas P. Dowd

[57] ABSTRACT

A method for rotating an image by 90 degrees includes the steps of: storing the image in a raster format arranged in r rows by c columns, image information in each row being stored in a number of bytes, each byte having b bits, there being c/b bytes in each row of the raster format; moving a block of the image into a temporary storage, there being r rows by v columns in the block; separating each image block into groups of bytes of rotatable size; determining for each group if all bits are the same value; rotating each group that does not have all bits the same value; storing each rotated group in an output area of the raster storage; repeating the above steps for all remaining blocks of the image.

18 Claims, 8 Drawing Figures

8x8 Bit Rotation Calculation for One Nibble

Lookup Tables for 8x8 Bit Rotation (hexadecimal)

| | tbl0 | tbl1 | tbl2 | tbl3 |
|---|---|---|---|---|
| 00 | 00000000 | 00000000 | 00000000 | 00000000 |
| 01 | 80000000 | 40000000 | 20000000 | 10000000 |
| 02 | 00800000 | 00400000 | 00200000 | 00100000 |
| 03 | 80800000 | 40400000 | 20200000 | 10100000 |
| 04 | 00008000 | 00004000 | 00002000 | 00001000 |
| 05 | 80008000 | 40004000 | 20002000 | 10001000 |
| 06 | 00808000 | 00404000 | 00202000 | 00101000 |
| 07 | 80808000 | 40404000 | 20202000 | 10101000 |
| 08 | 00000080 | 00000040 | 00000020 | 00000010 |
| 09 | 80000080 | 40000040 | 20000020 | 10000010 |
| 0A | 00800080 | 00400040 | 00200020 | 00100010 |
| 0B | 80800080 | 40400040 | 20200020 | 10100010 |
| 0C | 00008080 | 00004040 | 00002020 | 00001010 |
| 0D | 80008080 | 40004040 | 20002020 | 10001010 |
| 0E | 00808080 | 00404040 | 00202020 | 00101010 |
| 0F | 80808080 | 40404040 | 20202020 | 10101010 |

FIG. 6

Lookup Tables for 8x8 Bit Rotation (hexadecimal)

| | tbl4 | tbl5 | tbl6 | tbl7 |
|---|---|---|---|---|
| 00 | 00000000 | 00000000 | 00000000 | 00000000 |
| 01 | 08000000 | 04000000 | 02000000 | 01000000 |
| 02 | 00080000 | 00040000 | 00020000 | 00010000 |
| 03 | 08080000 | 04040000 | 02020000 | 01010000 |
| 04 | 00000800 | 00000400 | 00000200 | 00000100 |
| 05 | 08000800 | 04000400 | 02000200 | 01000100 |
| 06 | 00080800 | 00040400 | 00020200 | 00010100 |
| 07 | 08080800 | 04040400 | 02020200 | 01010100 |
| 08 | 00000008 | 00000004 | 00000002 | 00000001 |
| 09 | 08000008 | 04000004 | 02000002 | 01000001 |
| 0A | 00080008 | 00040004 | 00020002 | 00010001 |
| 0B | 08080008 | 04040004 | 02020002 | 01010001 |
| 0C | 00000808 | 00000404 | 00000202 | 00000101 |
| 0D | 08000808 | 04000404 | 02000202 | 01000101 |
| 0E | 00080808 | 00040404 | 00020202 | 00010101 |
| 0F | 08080808 | 04040404 | 02020202 | 01010101 |

FIG. 7

METHOD FOR ROTATING A BINARY IMAGE

BACKGROUND OF THE INVENTION

1. Field of the Invention

The present invention relates to digital image processing methods and more particularly to methods for image rotation.

2. Description of the Prior Art

The following are systems representative of the prior art.

U.S. Pat. No. 3,976,872 shows a method of rotation of an image by 90 degrees among other functions performed. However, the patent does not show a method for rotating an image by 90 degrees which includes testing groups of bits in the image to determine whether the group of bits is all the same value as does the present invention.

U.S. Pat. No. 3,968,475 shows a digital processor for extracting data from a binary image in which the image is divided into an array of sample areas each sample area containing an array of binary data spaces. Although the patent demonstrates image rotation by any one of a number of predetermined angles, the patent does not show a method for rotating an image by 90 degrees either clockwise or counterclockwise including testing the sample group to determine if all bits of the sample group are the same as does the method according to the present invention.

U.S. Pat. No. 4,052,699 relates to an image processing system wherein video data is stored in a matrix having n rows and n columns. The image is rotated 90 degrees in a piece-meal fashion by vertically accessing word by word video data previously stored as horizontal words. However, the method and apparatus of the patent do not test the group of words to be rotated to determine if all bits in the group are the same as does the method according to the present invention.

U.S. Pat. No. 4,168,488 shows hardware for image rotation of a word organized image buffer where the buffer is divided into a number of square sections each storing a portion of the full image. Although the patent shows apparatus for image rotation through an angle of 90 degrees, the patent does not show a method which includes testing a subimage to determine if all bits in the subimage are the same value as does the method according to the present invention.

U.S. Pat. No. 4,225,929 relates to a code converter including means for rotating an image about a center point. The patent does not include testing of bits in a subimage to determine if all bits are the same as does the method according to the present invention.

U.S. Pat. No. 4,271,476 relates to apparatus for rotating horizontal scan format images into vertical scan format images for printing or other processing. The patented apparatus divides the image into a number of sections and then rotates each section in sequence. The patent does not show a method including testing each section to determine if all bits are the same as does the method according to the present invention.

EPO published patent application no. 081,096 relates to an image rotation control circuit for controlling printing of an image on a printer. The published control circuit does not store the entire display but merely a single line at a time which is converted from a horizontal line to a vertical line or vice versa for printing. The publication does not show a method for rotating an image by 90 degrees including testing a portion of the image to determine if all bits representing picture elements are the same as does the method according to the present invention.

An article in the IBM Technical Disclosure Bulletin, Vol. 18, No. 8, January 1976, p. 2640 shows a method for rotation of images using contour compressed data. However, the article does not include testing portions of an image to determine if all bits are the same as does the method according to the present invention.

An article in the IBM Technical Disclosure Bulletin, Vol. 13, No. 11, April 1971, p. 3267 shows a method for performing a fast transformation of axes on two dimensional binary images. The article does not include testing portions of an image to determine if all bits are the same as does the method according to the present invention.

An article in the IBM Technical Disclosure Bulletin, Vol. 18, No. 8, January 1976 at page 2633 shows a shift register system for image orientation which among other functions rotates an image in 4×4 arrays of characters. The article does not include testing portions of an image to determine if all bits are the same as does the method according to the present invention.

The prior art discussed above does not teach nor suggest the present invention as disclosed and claimed herein.

SUMMARY OF THE INVENTION

Therefore, it is an object of the present invention to rotate an image by a method including the steps of: storing the image in a raster format arranged in r rows by c columns, image information in each row being stored in a number of bytes, each byte having b bits, there being c/b bytes in each row of the raster format; moving a block of the image into a temporary storage, there being r rows by v columns in the block; separating each image block into groups of bytes of rotatable size; determining for each group if all bits are the same value; rotating each group that does not have all bits the same value; storing each rotated group in an output area of the raster storage; repeating the above steps for all remaining blocks of the image.

It is another object of the present invention to rotate an image as above by a method further including the step of: moving remaining bytes to fill the space vacated by the removed image block if the image is to be rotated in situ.

Accordingly, a method for rotating an image by 90 degrees includes the steps of: storing the image in a raster format arranged in r rows by c columns, image informatin in each row being stored in a number of bytes, each byte having b bits, there being c/b bytes in each row of the raster format; moving a block of the image into a temporary storage, there being r rows by v columns in the block; separating each image block into groups of bytes of rotatable size; determining for each group if all bits are the same value; rotating each group that does not have all bits the same value; storing each rotated group in a output area of the raster storage; repeating the above steps for all remaining blocks of the image.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 6 is a first group of look up tables for rotation of an 8×8 block of an image in accordance with the method of the present invention.

FIG. 7 is a second group of look up tables for rotation of an 8×8 block of an image in accordance with the method of the present invention.

In the drawing, like elements are designated with similar reference numbers, and identical elements in different specific embodiments are designated by identical reference numbers.

DESCRIPTION OF PREFERRED EMBODIMENTS OF THE INVENTION

The method according to the present invention rotates an image clockwise or counterclockwise ninety degrees. Images are considered to exist in storage reading from left to right across the rows, from the top of the image to the bottom. Rotation may be performed in situ, or the output image may occupy separate storage which does not overlap the storage occupied by the original image. It is possible to extract a rectangular portion of a larger image, rotate it, and store it as a portion of another larger image, if desired. The present method performs an in situ rotation if the calling routine supplies the same address for the original and output images; if the output image address is not equal to the original image address, then the rotation is not performed in situ, the input image is not altered by the rotation, and the original and output images are not permitted to overlap. The two basic types of rotation are illustrated in FIG. 1 and FIG. 2.

Figure 1:
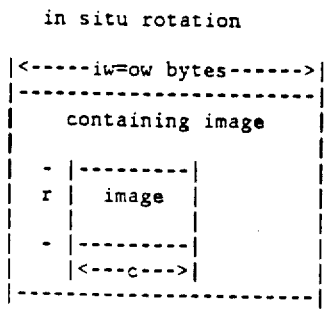
FIG. 1 is a schematic diagram of in situ rotation according to the present invention.

In the example shown in FIG. 1, the rotated image occupies the storage which contained the original image before rotation. For this type of rotation, the number of rows (r) must be a multiple of eight, since the bits in a vertical column are packed into bytes by the rotation and a row of the output image must not end with a fraction of a byte.

Figure 2:
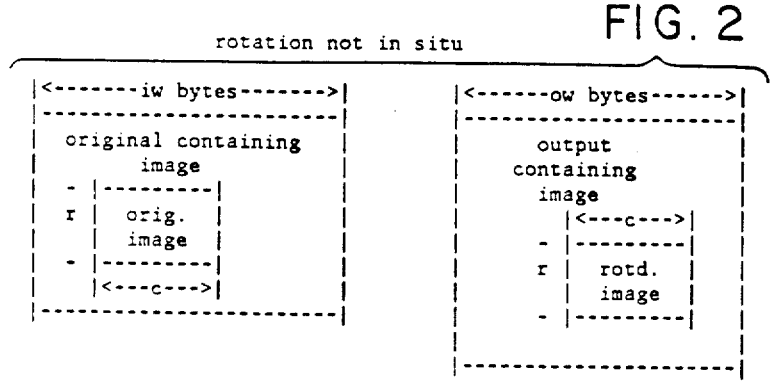
FIG. 2 is a schematic diagram of not in situ rotation according to the present invention.

In the example of FIG. 2, the original and rotated images occupy separate areas in storage. The original image is not altered by the rotation operation. If the number of rows is not a multiple of eight, the right edge of the rotated image will be filled out to a byte boundary with zeroes. The original and rotated images may not be wider than their respective containing images (although they may be the same width). If the area of storage between the first and last bytes (inclusive) of the original image overlaps the area of storage between the first and last bytes (inclusive) of the output image, the widths of the original and output containing images must be equal.

Figure 3:
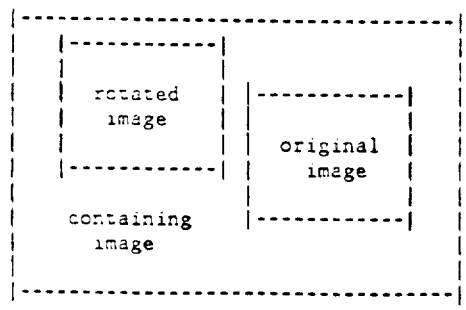
FIG. 3 is a schematic diagram of rotation of subimages according to the present invention.

In the example of FIG. 3, the original and rotated images are assumed to be part of the same containing image.

The program embodying the present invention requires a single parameter PARM which gives the address of a list of six parameters controlling the rotation. These parameters are stored in a 24-byte buffer; all parameters are full 4 byte words. FIXED(31) specifies a 4 byte value; PTR(31) indicates variables which will be addresses. The six parameters are:

```
DCL
PARM                    PTR(31); DCL
 1 LIST BASED(PARM),
 2 INIMAGE              PTR(31),
 2 OUTIMAGE             PTR(31),
 2 IROWS                FIXED(31),
 2 ICOLS                FIXED(31),
 2 IWID                 FIXED(31),
 2 OWID                 FIXED(31);
```

INIMAGE —Pointer to the first byte (i.e. the upper left-hand corner byte) of the original image.

OUTIMAGE —Pointer to the location where the first byte of the output image is to be stored.

IROWS —Number of lines in the original image. (Corresponds to "r" in FIGS. 1, 2, and 3.)

ICOLS —Number of (byte) columns in the original image. (Corresponds to "c" in FIGS. 1, 2, and 3.

IWID —Number of (byte) columns in the image of which the original image is a part. If IWID=0, the width of the original image (ICOLS) is substituted for IWID. (IWID corresponds to "iw" in FIGS. 1, 2, and 3.)

OWID —Number of (byte) columns in the image of which the output image is a part. If OWID=0, the width of the output image (the integer quotient of (IROWS+7)/8) is substituted for OWID. (OWID corresponds to "ow" in FIGS. 1, 2, and 3.)

The problem considered here is that of rotating a binary image in storage clockwise or counterclockwise by ninety degrees. The rotation algorithm proposed uses a novel combination of techniques (such as a fast rotation algorithm for an eight by eight bit unit and exploitation of the fact that a binary image typically includes large areas containing only zero (white) picture elements) to produce code which is significantly (four to 12 times) faster than current methods.

We describe the counterclockwise case in detail; the required modifications for the clockwise case are summarized at the end of this specification. The bits making up the image are assumed to be stored packed eight to a byte. Since bit operations are computationally expensive, the image is divided into eight by eight bit blocks. The bits in an eight by eight bit block may be rotated relatively efficiently; the blocks are rearranged in storage to complete the rotation process. The image rotation may take place in situ, or the output image may be constructed in an area of storage which does not overlap with the input image.

Figure 4:
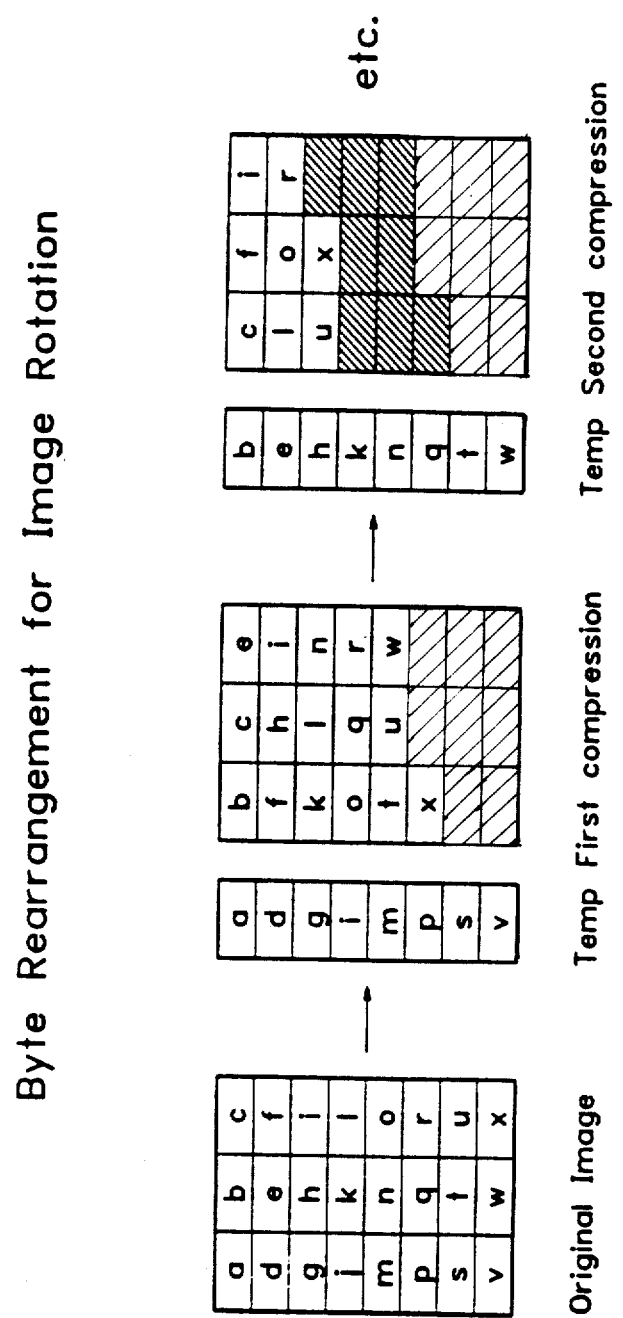
FIG. 4 is a schematic diagram of byte rearrangement for image rotation according to the present invention.

The block rearrangement for in situ rotation proceeds as illustrated in FIG. 4. The first 32 bytes of each row of the input image are copied into temporary storage. (The number 32 is arbitrary; it controls the amount of temporary storage required to perform the algorithm.) The remaining bytes in each row of the input image are "moved up" in storage, filling in the space left by the removal of the first 32 bytes of each row and leaving a space at the end of the input image which will accommodate the data from the temporary buffer which must be moved into it. This empty space is cleared (for reasons explained below) and the data from the temporary storage area is rotated and stored in the empty space, producing the last 256 lines of the output image. (Since the rotation of the image is counterclockwise, the data from the left edge moves to the bottom of the image; 32 bytes, or 256 bits, of data was taken from each row, so that 256 lines of output are produced.)

Next, the next 32 bytes from each row are copied into temporary storage, and the remaining data in the rows of the input image are compressed as before. The 256 lines of output image already produced are not distrubed. An empty space now exists immediately before the last 256 lines of the output image; this area is cleared and the data from the temporary buffer are rotated into it.

This process continues until no data is left in the input image. The size of a row of the original image need not be a multiple of 32; if it is not, the last rotation operation acts on only the number of leftover bytes which were in the input image.

If the input and output images do not occupy the same storage, the output image may be cleared before the rotation begins. Successive groups of 32 bytes from each row are copied into temporary storage for processing, but the input image is not compressed after each copy operation; it is left intact. Since the input image does not have to be compressed, this type of rotation is slightly faster than in situ rotation.

Rotation of the bits in the individual eight by eight bit blocks occurs as the data from temporary storage are rotated into their final positions in the output array. The data in the temporary storage area are processed in four-byte-wide columns. (The case in which the number of bytes of data in each row is not a multiple of four is treated separately but the process is essentially the same.) Eight lines of the input image are processed at a time. The basic problem is thus to take a four by eight byte (32 by 8 bit) image, rotate the four eight by eight blocks within it, and position them in the output array.

The first step in the process is to determine whether all of the bits in the 32 by 8 bit block are zero. In this case, no processing is necessary, since the output from the rotation will be a block of zeroes, and the area in the output array where the rotated block would be stored has already been zeroed. Recognizing that no processing is necessary for this case is an important element in gaining speed in the algorithm, since most of the execution time would normally be spent in the rotation of the eight by eight bit blocks, and the case where a 32 by 8 bit block contains entirely of zeroes occurs for from approximately one-third of the image (for kanji or dense text) to over four-fifths of the image (for some drawings and relatively sparse text, e.g. memos).

Figure 5:
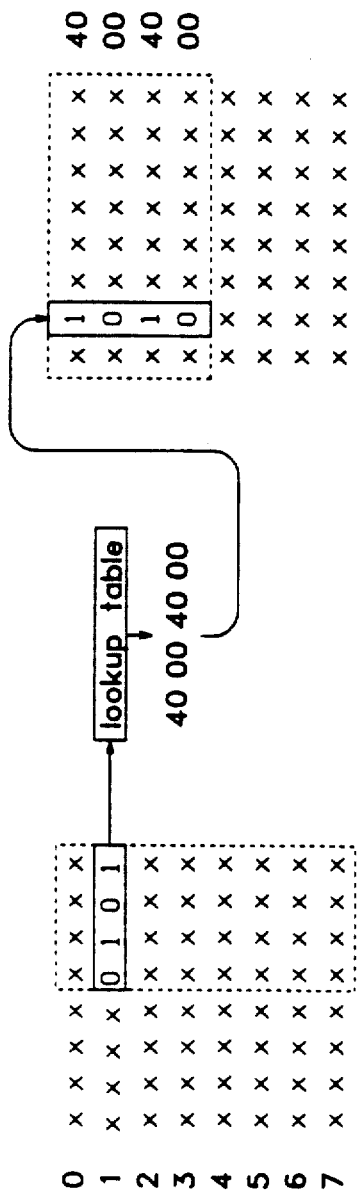
FIG. 5 is a schematic diagram of rotation of a nibble by the method of the present invention.
Figure 8:
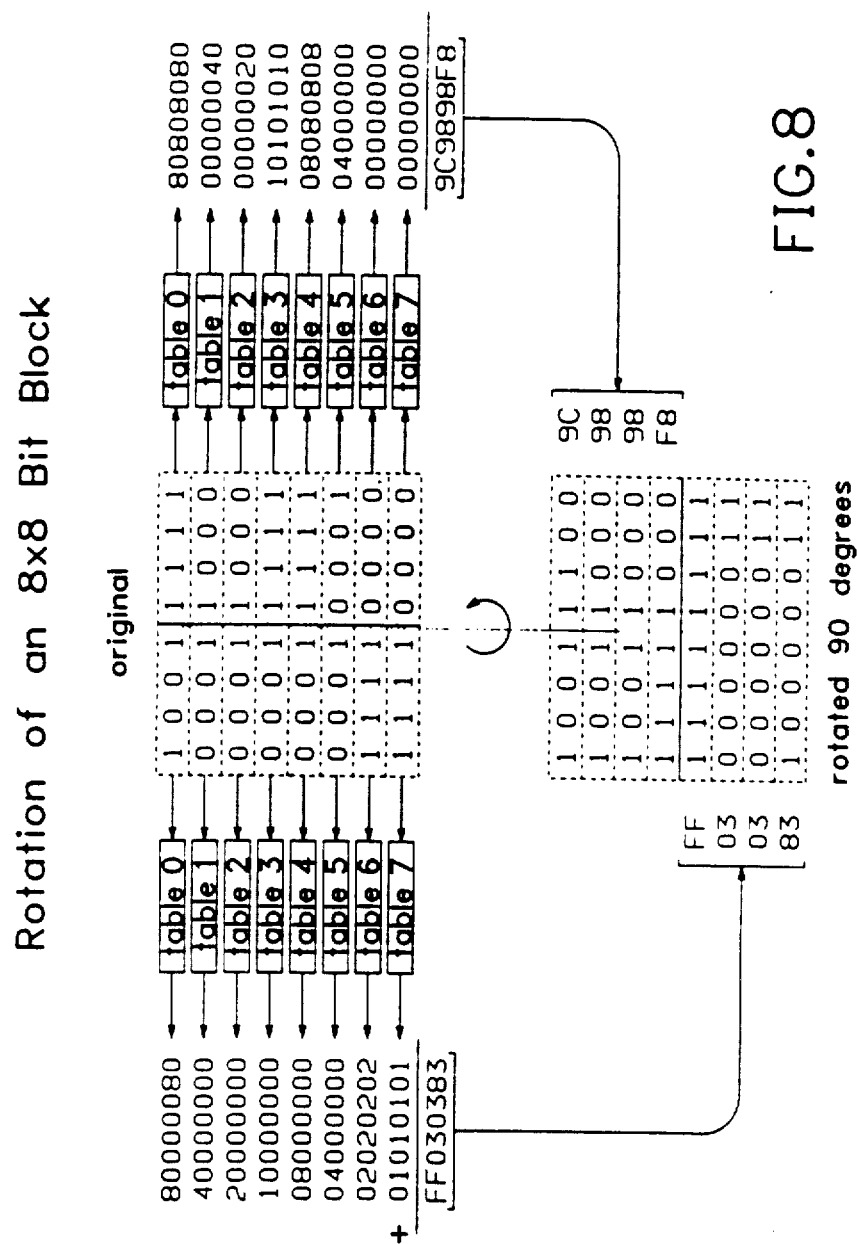
FIG. 8 is a diagram of the method for rotating an 8×8 bit block in accordance with the method of the present invention.

If a 32 by 8 bit block contains some nonzero bits, it is broken up into four eight by eight bit blocks. Each of these blocks is then checked to see if it consists entirely of zeroes; if it does, it can be skipped as described above. Otherwise the block is rotated using the algorithm illustrated in FIG. 5. This algorithm is described in more detail below. Briefly, the eight bytes are broken up into nibbles, which are used to index into a set of lookup tables shown in FIGS. 6 and 7. These tables are constructed so that when the values looked up for the low- or high-order nibbles are summed, the result gives the first or last four bytes in the rotated block. See FIG. 8.

In addition to rotating an entire image, this algorithm may be used to extract a rectangular portion of one image and rotate it into a rectangular portion of another image. This is done by skipping over the data in the portions of the rows of the input image which are not part of the area to be rotated, and by similarly leaving an appropriate amount of space between the rows of the output image. This type of rotation cannot conveniently be performed in situ by this algorithm; our implementation allows it only when the input and output images are separate.

In order to perform a clockwise rotation, we would simply perform the copy/compress process moving from right to left rather than from left to right (i.e. copy the last 32 bytes from each line into temporary storage at each stage), rotate the data from temporary storage into the output image so that the rightmost (rather than the leftmost) eight by eight bit blocks are rotated to the bottom of the output image, and change the lookup tables used in the rotation of eight by eight bit blocks to produce a clockwise rather than a counterclockwise rotation.

The program embodying the present invention requires an area of storage to contain its variables. These variables are as follows:

| \multicolumn{3}{c}{Variables in storage shared by all procedures} | | |
|---|---|---|
| name | type | offset from beginning of storage |
| inimage | PTR(31) | 0 |
| inimageb | FIXED(8) | 0 |
| outimage | PTR(31) | 4 |
| outimageb | FIXED(8) | 4 |
| irows | FIXED(32) | 8 |
| icols | FIXED(32) | 12 |
| iwid | FIXED(32) | 16 |
| owid | FIXED(32) | 20 |
| etemp | PTR(31) | 24 |
| svb | PTR(31) | 28 |
| b0ix | PTR(31) | 32 |
| b01im | PTR(31) | 36 |
| tindex | PTR(31) | 40 |
| p | PTR(31) | 44 |
| nccols | FIXED(32) | 48 |
| owid2 | FIXED(32) | 52 |
| owid3 | FIXED(32) | 56 |
| owid4 | FIXED(32) | 60 |
| owid5 | FIXED(32) | 64 |
| owid6 | FIXED(32) | 68 |
| owid7 | FIXED(32) | 72 |
| owid8 | FIXED(32) | 76 |
| ocols | FIXED(32) | 80 |
| orows | FIXED(32) | 84 |
| tsize | FIXED(32) | 88 |
| ttail | FIXED(32) | 92 |
| x | FIXED(32) | 96 |
| ccols | FIXED(32) | 100 |
| bite | FIXED(32) | 104 |
| t | FIXED(32) | 108 |
| x1(8) | FIXED(8), indexed | 112 |
| i11 | FIXED(32) | 112 |
| i21 | FIXED(32) | 116 |
| xu(8) | FIXED(8), indexed | 120 |
| i1u | FIXED(32) | 120 |
| i2u | FIXED(32) | 124 |
| whole | FIXED(32) | 128 |
| whole0 | FIXED(8) | 128 |
| whole1 | FIXED(8) | 129 |
| whole2 | FIXED(8) | 130 |
| whole3 | FIXED(8) | 131 |
| w | FIXED(32) | 132 |
| wb0 | FIXED(8) | 132 |
| wb1 | FIXED(8) | 133 |

-continued

Variables in storage shared by all procedures

| name | type | offset from beginning of storage | |
|---|---|---|---|
| wb2 | FIXED(8) | 134 | |
| wb3 | FIXED(8) | 135 | |
| isflag | FIXED(8) | 136 | |
| resflag | FIXED(8) | 137 | |
| lut0(16) | FIXED(32) | 140 | |
| lut1(16) | FIXED(32) | 204 | |
| lut2(16) | FIXED(32) | 268 | |
| lut3(16) | FIXED(32) | 332 | |
| lut4(16) | FIXED(32) | 396 | |
| lut5(16) | FIXED(32) | 460 | |
| lut6(16) | FIXED(32) | 524 | |
| lut7(16) | FIXED(32) | 588 | |
| tempbuf(N) | FIXED(32) | 652 | (N < 64*(irows+7)/8) |

Variables based on the pointer "b0"

| name | type | offset from b0 |
|---|---|---|
| bx(228) | FIXED(8), indexed | 0 |
| w0 | FIXED(32) | 0 |
| w1 | FIXED(32) | 32 |
| w2 | FIXED(32) | 64 |
| w3 | FIXED(32) | 96 |
| w4 | FIXED(32) | 128 |
| w5 | FIXED(32) | 160 |
| w6 | FIXED(32) | 192 |
| w7 | FIXED(32) | 224 |

Variable based on the pointer "b1"

| name | type | offset from b1 |
|---|---|---|
| by(8*owid) | FIXED(8),indexed | 0 |

The lookup tables lut0, lut1, . . . lut7 are initialized with the following hexadecimal values:

| | | | | |
|---|---|---|---|---|
| lut0: | 00000000 | 80000000 | 00800000 | 80800000 |
| | 00008000 | 80008000 | 00808000 | 80808000 |
| | 00000080 | 80000080 | 00800080 | 80800080 |
| | 00008080 | 80008080 | 00808080 | 80808080 |
| lut1: | 00000000 | 40000000 | 00400000 | 40400000 |
| | 00004000 | 40004000 | 00404000 | 40404000 |
| | 00000040 | 40000040 | 00400040 | 40400040 |
| | 00004040 | 40004040 | 00404040 | 40404040 |
| lut2: | 00000000 | 20000000 | 00200000 | 20200000 |
| | 00002000 | 20002000 | 00202000 | 20202000 |
| | 00000020 | 20000020 | 00200020 | 20200020 |
| | 00002020 | 20002020 | 00202020 | 20202020 |
| lut3: | 00000000 | 10000000 | 00100000 | 10100000 |
| | 00001000 | 10001000 | 00101000 | 10101000 |
| | 00000010 | 10000010 | 00100010 | 10100010 |
| | 00001010 | 10001010 | 00101010 | 10101010 |
| lut4: | 00000000 | 08000000 | 00080000 | 08080000 |
| | 00000800 | 08000800 | 00080800 | 08080800 |
| | 00000008 | 08000008 | 00080008 | 08080008 |
| | 00000808 | 08000808 | 00080808 | 08080808 |
| lut5: | 00000000 | 04000000 | 00040000 | 04040000 |
| | 00000400 | 04000400 | 00040400 | 04040400 |
| | 00000004 | 04000004 | 00040004 | 04040004 |
| | 00000404 | 04000404 | 00040404 | 04040404 |
| lut6: | 00000000 | 02000000 | 00020000 | 02020000 |
| | 00000200 | 02000200 | 00020200 | 02020200 |
| | 00000002 | 02000002 | 00020002 | 02020002 |
| | 00000202 | 02000202 | 00020202 | 02020202 |
| lut7: | 00000000 | 01000000 | 00010000 | 01010000 |
| | 00000100 | 01000100 | 00010100 | 01010100 |
| | 00000001 | 01000001 | 00010001 | 01010001 |
| | 00000101 | 01000101 | 00010101 | 01010101 |

Since the language in which this program is written employs forward Polish notation, an end-of-statement symbol (such as the ";" in PL/I) is unnecessary in most cases. Statements may extend over multiple lines.

All array indices are expressed as offsets in bytes from the beginning of the array.

The following subroutines are assumed to be available:

```
procedure copycompr;

b0=inimage b1=b0 nccols=-ccols x p=addr tempbuf if nccols>0 begin if p<etemp call copy(p,b1,32)

b1=+b1 x call copy(b0,b1,nccols)

b0=+b0 nccols b1=+b1 nccols p=+p 32 repeat end end call zero(b0,tsize)

else begin if p<etemp call copy(p,b1,32)

b1=+b1 ccols p=+p 32 repeat
```

```
        end
      end
      call zero(inimage,*ccols irows)
    end
  end
  procedure copy32;
    b1=inimage
    inimage=+inimage x
    p=addr tempbuf
    begin
      if p<etemp
        call copy(p,b1,32)
        b1=+b1 iwid
        p=+p 32
      repeat
    end
    if ttail¬=0
      call zero(etemp,ttail)
    end
  end
  procedure pr32;
    b0lim=-+addr tempbuf x 256
    b0ix=-addr tempbuf 260
    begin
      b0=+b0ix 4
      if b0¬<b0lim leave end
      b0ix=b0
      b1=tindex
      b1=-b1 sll owid 5
      tindex=b1
      begin
        b0=+b0 256
        if b0¬<etemp leave end
        b1=+b1 1
        whole=or or or or or or or w0 w1 w2
          w3 w4 w5 w6 w7
        if whole=0
          repeat
        end
        svb=b1
        if whole3=0 goto byte2 end
        wb0=bx(003)
        wb1=bx(035)
        wb2=bx(067)
        wb3=bx(099)
        i1l=and X'3C3C3C3C' (sll w 2)
        i1u=and X'3C3C3C3C' (srl w 2)
        wb0=bx(131)
        wb1=bx(163)
        wb2=bx(195)
        wb3=bx(227)
        i2l=and X'3C3C3C3C' (sll w 2)
        i2u=and X'3C3C3C3C' (srl w 2)
        w=+++++++lut0(x1(0)) lut1(x1(1))
                 lut2(x1(2)) lut3(x1(3))
                 lut4(x1(4)) lut5(x1(5))
                 lut6(x1(6)) lut7(x1(7))
        by(0)    =wb0
```

```
by(owid) =wb1 by(owid2)=wb2 by(owid3)=wb3 w=+++++++lut0(xu(0))  lut1(xu(1))
        lut2(xu(2))  lut3(xu(3))
        lut4(xu(4))  lut5(xu(5))
        lut6(xu(6))  lut7(xu(7))

by(owid4)=wb0 by(owid5)=wb1 by(owid6)=wb2 by(owid7)=wb3 label byte2 b1=+b1 owid8 if whole2=0 goto byte1 end wb0=bx(002)

wb1=bx(034)

wb2=bx(066)

wb3=bx(098)

il1=and X'3C3C3C3C' (sll w 2)

ilu=and X'3C3C3C3C' (srl w 2)

wb0=bx(130)

wb1=bx(162)

wb2=bx(194)

wb3=bx(226)

i2l=and X'3C3C3C3C' (sll w 2)

i2u=and X'3C3C3C3C' (srl w 2)

w=+++++++lut0(xl(0))  lut1(xl(1))
          lut2(xl(2))  lut3(xl(3))
          lut4(xl(4))  lut5(xl(5))
          lut6(xl(6))  lut7(xl(7))

by(0)    =wb0 by(owid) =wb1 by(owid2)=wb2 by(owid3)=wb3 w=+++++++lut0(xu(0))  lut1(xu(1))
        lut2(xu(2))  lut3(xu(3))
        lut4(xu(4))  lut5(xu(5))
        lut6(xu(6))  lut7(xu(7))

by(owid4)=wb0 by(owid5)=wb1 by(owid6)=wb2 by(owid7)=wb3 label byte1 b1=+b1 owid8 if whole1=0 goto byte0 end wb0=bx(001)

wb1=bx(033)

wb2=bx(065)

wb3=bx(097)

il1=and X'3C3C3C3C' (sll w 2)

ilu=and X'3C3C3C3C' (srl w 2)

wb0=bx(129)

wb1=bx(161)

wb2=bx(193)

wb3=bx(225)

i2l=and X'3C3C3C3C' (sll w 2)

i2u=and X'3C3C3C3C' (srl w 2)

w=+++++++lut0(xl(0))  lut1(xl(1))
```

```
            lut2(xl(2)) lut3(xl(3))
            lut4(xl(4)) lut5(xl(5))
            lut6(xl(6)) lut7(xl(7))
by(0)    =wb0
by(owid) =wb1
by(owid2)=wb2
by(owid3)=wb3
w=+++++++lut0(xu(0)) lut1(xu(1))
            lut2(xu(2)) lut3(xu(3))
            lut4(xu(4)) lut5(xu(5))
            lut6(xu(6)) lut7(xu(7))
by(owid4)=wb0
by(owid5)=wb1
by(owid6)=wb2
by(owid7)=wb3
label byte0
   if whole0=0
     b1=svb
     repeat
   end
b1=+b1 owid8
wb0=bx(000)
wb1=bx(032)
wb2=bx(064)
wb3=bx(096)
i1l=and X'3C3C3C3C' (sll w 2)
i1u=and X'3C3C3C3C' (srl w 2)
wb0=bx(128)
wb1=bx(160)

wb2=bx(192)
wb3=bx(224)
i2l=and X'3C3C3C3C' (sll w 2)
i2u=and X'3C3C3C3C' (srl w 2)
w=+++++++lut0(xl(0)) lut1(xl(1))
            lut2(xl(2)) lut3(xl(3))
            lut4(xl(4)) lut5(xl(5))
            lut6(xl(6)) lut7(xl(7))
by(0)    =wb0
by(owid) =wb1
by(owid2)=wb2
by(owid3)=wb3
w=+++++++lut0(xu(0)) lut1(xu(1))
            lut2(xu(2)) lut3(xu(3))
            lut4(xu(4)) lut5(xu(5))
            lut6(xu(6)) lut7(xu(7))
by(owid4)=wb0
by(owid5)=wb1
by(owid6)=wb2
by(owid7)=wb3
   b1=svb
   repeat
  end
 repeat
 end
end
procedure pr32last;
  b0=+-addr tempbuf 256 x
  b1=-outimage 1
```

```
begin b0=+b0 256 if b0¬<etemp leave end b1=+b1 1 whole=or or or or or or or w0 w1 w2
    w3 w4 w5 w6 w7 if whole=0 repeat end svb=b1 if resflag llt 3 if resflag=2 goto lbyte1x else goto lbyte0x end end if whole2=0 goto lbyte1 end wb0=bx(002)

wb1=bx(034)

wb2=bx(066)

wb3=bx(098)

i1l=and X'3C3C3C3C' (sll w 2)

i1u=and X'3C3C3C3C' (srl w 2)

wb0=bx(130)

wb1=bx(162)

wb2=bx(194)

wb3=bx(226)

i2l=and X'3C3C3C3C' (sll w 2)

i2u=and X'3C3C3C3C' (srl w 2)

w=+++++++lut0(xl(0)) lut1(xl(1))
           lut2(xl(2)) lut3(xl(3))
           lut4(xl(4)) lut5(xl(5))
           lut6(xl(6)) lut7(xl(7))

by(0)    =wb0 by(owid) =wb1 by(owid2)=wb2 by(owid3)=wb3 w=+++++++lut0(xu(0)) lut1(xu(1))
           lut2(xu(2)) lut3(xu(3))
           lut4(xu(4)) lut5(xu(5))
           lut6(xu(6)) lut7(xu(7))

by(owid4)=wb0 by(owid5)=wb1
  by(owid6)=wb2 by(owid7)=wb3 label lbyte1 b1=+b1 owid8 label lbyte1x if whole1=0 goto lbyte0 end wb0=bx(001)

wb1=bx(033)

wb2=bx(065)

wb3=bx(097)

i1l=and X'3C3C3C3C' (sll w 2)

i1u=and X'3C3C3C3C' (srl w 2)

wb0=bx(129)
```

```
wb1=bx(161)

wb2=bx(193)

wb3=bx(225)

i2l=and X'3C3C3C3C' (sll w 2)

i2u=and X'3C3C3C3C' (srl w 2)

w=+++++++lut0(xl(0)) lut1(xl(1))
        lut2(xl(2)) lut3(xl(3))
        lut4(xl(4)) lut5(xl(5))
        lut6(xl(6)) lut7(xl(7))

by(0)    =wb0 by(owid) =wb1 by(owid2)=wb2 by(owid3)=wb3 w=+++++++lut0(xu(0)) lut1(xu(1))
        lut2(xu(2)) lut3(xu(3))
        lut4(xu(4)) lut5(xu(5))
        lut6(xu(6)) lut7(xu(7))

by(owid4)=wb0 by(owid5)=wb1 by(owid6)=wb2 by(owid7)=wb3 label lbyte0 if whole0=0 b1=svb repeat end b1=+b1 owid8 label lbyte0x wb0=bx(000)

wb1=bx(032)

wb2=bx(064)

wb3=bx(096)

i1l=and X'3C3C3C3C' (sll w 2)

i1u=and X'3C3C3C3C' (srl w 2)

wb0=bx(128)

wb1=bx(160)

wb2=bx(192)

wb3=bx(224)

i2l=and X'3C3C3C3C' (sll w 2)

i2u=and X'3C3C3C3C' (srl w 2)

w=+++++++lut0(xl(0)) lut1(xl(1))
        lut2(xl(2)) lut3(xl(3))
        lut4(xl(4)) lut5(xl(5))
        lut6(xl(6)) lut7(xl(7))

by(0)    =wb0 by(owid) =wb1 by(owid2)=wb2 by(owid3)=wb3 w=+++++++lut0(xu(0)) lut1(xu(1))
        lut2(xu(2)) lut3(xu(3))
        lut4(xu(4)) lut5(xu(5))
        lut6(xu(6)) lut7(xu(7))

by(owid4)=wb0 by(owid5)=wb1 by(owid6)=wb2 by(owid7)=wb3 b1=svb
```

```
    repeat end end procedure turn90cc(argpt);

("argpt" gives the address of the
   argument buffer)
call copy(addr inimage,argpt,24)

inimageb=0 outimageb=0 orows=sll icols 3 ocols=sra +irows 7 3 if iwid=0 iwid=icols end if owid=0 owid=ocols end if outimage=inimage isflag=1 else isflag=0 ttail=sll -sll ocols 3 irows 5 b0=outimage if owid=ocols call zero(b0,*ocols orows)

else t=orows begin if t¬>0 leave end call zero(b0,ocols)

b0=+b0 owid t=-t 1 repeat end end end tsize=sll irows 5 ccols=icols tindex=-+outimage *owid orows 1 etemp=+addr tempbuf tsize owid2=*owid 2 owid3=*owid 3 owid4=*owid 4 owid5=*owid 5 owid6=*owid 6 owid7=*owid 7 owid8=*owid 8 resflag=0 begin if ccols=0 leave end if ccols>32 x=32 else x=ccols end if isflag=1 call copycompr else call copy32
```

```
end resflag=expl and x 3 x=and x _4 if x¬=0 call pr32 end if resflag¬=0 call pr32last leave end ccols=-ccols x repeat end end
```

Thus, while the invention has been described with reference to preferred embodiments thereof, it will be understood by those skilled in the art that various changes in form and details may be made without departing from the scope of the invention.

What is claimed is:

1. A method for rotating a binary image in place by 90 degrees comprising the steps of:
   storing said image in raster form as a sequence of bytes in an image buffer, said bytes representing said image in the form of r rows by c columns and each byte having b bits;
   dividing said image vertically into a series of blocks, each block having r rows;
   copying one block of said image bytes into a temporary storage buffer;
   rearranging the uncopied bytes in the image buffer to make available a region having an area equal to that of the copied block and at the location in the image buffer where said copied block will fit after rotation, by overwriting a portion of the copied image bytes with uncopied image bytes;
   separating said copied bytes in said temporary storage buffer into groups of m×m bits for rotation;
   transferring each group to the available region of the image buffer, such that said groups are stored in rotated raster form; repeating said steps of copying, rearranging, separating, and transferring on the successive blocks of said uncopied image bytes to store said image in said image buffer in rotated form.

2. A method as in claim 1 wherein said transferring step comprises:
   determining for each said group if all bits have the same value;
   copying each group having all bits the same value to the appropriate location in said available region of said image buffer;
   rotating each group that does not have all bits the same value; and storing each rotated group with said copied groups in raster form in the appropriate location in said available region of said image buffer.

3. A method as in claim 2 wherein said rotating step comprises the further steps of:
   creating a lookup table which takes an index value and produces an output consisting of the bits of the index value spaced at intervals of m bits, separated by bits having the value zero;
   dividing said m×m group of bits to be rotated into subunits of equal size for use in indexing said lookup table;
   applying each said subunit as an index to said lookup table;
   shifting the resulting output values according to the position of the index subunit in the group of bits to be rotated;
   combining the shifted output values; and
   storing the resulting bits as a rotated m×m bit block.

4. A method as in claim 1 wherein said transferring step comprises:
   filling said available region of said image buffer with bits of a first binary value;
   determining for each said group if all bits have said first binary value;
   rotating each group that does not have all bits of said first binary value; and
   storing each rotated group in raster form in the appropriate location in said available region of said image buffer.

5. A method as in claim 4 wherein said rotating step comprises the further steps of:
   creating a lookup table which takes an index value and produces an output consisting of the bits of the index value spaced at intervals of m bits, separated by bits having the value zero;
   dividing said m×m group of bits to be rotated into subunits of equal size for use in indexing said lookup table;
   applying each said subunit as an index to said lookup table;
   shifting the resulting output values according to the position of the index subunit in the group of bits to be rotated;
   combining the shifted output values; and
   storing the resulting bits as a rotated m×m bit block.

6. A method as in claim 1 wherein r equals c.

7. A method as in claim 1 wherein b equals 8 and said groups comprise 8 by 8 bit blocks.

8. A method as in claim 2 wherein said rotating step comprises the steps of:
   creating a plurality of lookup tables which take an index value and produce an output consisting of the bits of the index value spaced at intervals of m bits, separated by bits having the value zero, and shifted by differing numbers of bits;
   dividing said m×m group of bits to be rotated into subunits of equal size for use in indexing said lookup tables;
   applying each said subunit as an index to one of said lookup tables, the table used in each case being determined by the position of the index subunit in the group of bits to be rotated;

combining the shifted output values; and storing the resulting bits as a rotated m×m bit block.

9. A method as in claim 4 wherein said rotating step comprises the steps of:

creating a plurality of lookup tables which take an index value and produce an output consisting of the bits of the index value spaced at intervals of m bits, separated by bits having the value zero, and shifted by differing numbers of bits;

dividing said m×m group of bits to be rotated into subunits of equal size for use in indexing said lookup tables;

applying each said subunit as an index to one of said lookup tables, the table used in each case being determined by the position of the index subunit in the group of bits to be rotated;

combining the shifted output values; and storing the resulting bits as a rotated m×m bit block.

10. A system for rotating a binary image by 90 degrees in place comprising:

image buffer means for storing said image in raster form as a sequence of bytes, said bytes representing said image in the form of r rows by c columns and each byte having b bits;

means for dividing said image vertically into a series of blocks, each block having r rows;

a temporary storage buffer;

means for copying one block of said image bytes into said temporary storage buffer;

means for rearranging the uncopied bytes in said image buffer means to make available a region of the image buffer means, having an area equal to that of the copied block and at the location in the image buffer means where said copied block will fit after rotation; by overwriting a portion of the copied image bytes with uncopied image bytes;

means for separating said copied bytes in said temporary storage buffer into groups of m×m bits for rotation;

means for transferring each group from said temporary storage buffer to the available region of the image buffer means, such that said groups are stored in rotated raster form in said region; and means for actuating said copying, rearranging, separating, and transferring means to act on the successive blocks of said uncopied image bytes to rotate said stored image in said image buffer means.

11. A system as in claim 10 wherein said transferring means comprises:

means for determining for each said group if all bits have the same value;

means for copying each group having all bits the same value to the appropriate location in said available region of said image buffer means;

means for rotating each group that does not have all bits the same value; and means for transferring each rotated group to storage with said copied groups in raster form in the appropriate location in said available region of said image buffer means.

12. A system as in claim 11 wherein said rotating means comprises a lookup table which takes an index value and produces an output consisting of the bits of the index value spaced at intervals of m bits, separated by bits having the value zero;

means for dividing said m×m group of bits to be rotated into subunits of equal size for use in indexing said lookup table;

means for applying each said subunit as an index to said lookup table;

means for shifting the resulting output values according to the position of the index subunit in the group of bits to be rotated;

means for combining the shifted output values; and means for storing the resulting bits as a rotated m×m bit block.

13. A system as in claim 11 wherein said rotating means comprises:

means for creating a plurality of lookup tables which take an index value and produce an output consisting of the bits of the index value spaced at intervals of m bits, separated by bits having the value zero, and shifted by differing numbers of bits;

means for dividing said m×m group of bits to be rotated into subunits of equal size for use in indexing said lookup table means;

means for applying each of said subunits as an index to said lookup table means in accordance with the respective position of the index subunit in the group of bits to be rotated;

means for combining the shifted output values; and means for storing the resulting bits as a rotated m×m bit block.

14. A system as in claim 10 wherein said transferring means comprises:

means for filling said available region of said image buffer with bits of a first binary value;

means for determining for each said group if all bits have said first binary value;

means for rotating each group that does not have all bits of said first binary value; and means for storing each rotated group in raster form in the appropriate location in said available region of said image buffer.

15. A system as in claim 14 wherein said rotating means comprises:

lookup table means for taking an index value and producing an output consisting of the bits of the index value spaced at intervals of m bits, separated by bits having the value zero;

means for dividing said m×m group of bits to be rotated into subunits of equal size for use in indexing said lookup table means;

means for applying each said subunit as an index to said lookup table means;

means for shifting the resulting output values according to the position of the index subunit in the group of bits to be rotated;

means for combining the shifted output values; and means for storing the resulting bits as a rotated m×m bit block.

16. A system as in claim 14 wherein said rotating means comprises:

means for creating a plurality of lookup tables which take an index value and produce an output consisting of the bits of the index value spaced at intervals of m bits, separated by bits having the value zero, and shifted by differing numbers of bits;

means for dividing said m×m group of bits to be rotated into subunits of equal size for use in indexing said lookup table means;

means for applying each of said subunits as an index to said lookup table means in accordance with the respective position of the index subunit in the group of bits to be rotated;

means for combining the shifted output values; and means for storing the resulting bits as a rotated m×m bit block.

17. A system as in claim 10 wherein r equals c.

18. A system as in claim 10 wherein n equals 8 and said groups comprise 8 by 8 bit blocks.

* * * * *